United States Patent
Nieto-Caballero et al.

(10) Patent No.: US 12,406,656 B2
(45) Date of Patent: Sep. 2, 2025

(54) SPOKEN LANGUAGE RECOGNITION

(71) Applicant: ADOBE INC., San Jose, CA (US)

(72) Inventors: Oriol Nieto-Caballero, Oakland, CA (US); Zeyu Jin, San Francisco, CA (US); Justin Jonathan Salamon, San Francisco, CA (US); Franck Dernoncourt, Spokane, WA (US)

(73) Assignee: ADOBE INC., San Jose, CA (US)

( * ) Notice: Subject to any disclaimer, the term of this patent is extended or adjusted under 35 U.S.C. 154(b) by 403 days.

(21) Appl. No.: 18/104,434

(22) Filed: Feb. 1, 2023

(65) Prior Publication Data

US 2024/0257798 A1    Aug. 1, 2024

(51) Int. Cl.
*G10L 25/30*    (2013.01)
*G10L 15/00*    (2013.01)

(52) U.S. Cl.
CPC ............ *G10L 15/005* (2013.01); *G10L 25/30* (2013.01)

(58) Field of Classification Search
CPC .............................. G10L 15/005; G10L 25/30
USPC .......................................................... 704/213
See application file for complete search history.

(56) References Cited

U.S. PATENT DOCUMENTS

| | | | | |
|---|---|---|---|---|
| 2016/0293167 A1* | 10/2016 | Chen | ............... | H04N 21/23406 |
| 2020/0065612 A1* | 2/2020 | Xu | ................ | G06V 40/174 |
| 2020/0193296 A1* | 6/2020 | Dixit | ................ | G06N 3/063 |
| 2021/0158802 A1* | 5/2021 | Lee | ................ | G10L 15/16 |
| 2022/0138472 A1* | 5/2022 | Mittal | ................ | G06N 3/045 |
| | | | | 382/181 |
| 2022/0198254 A1* | 6/2022 | Dalli | ................ | G06N 3/084 |
| 2023/0020965 A1* | 1/2023 | Yue | ................ | G06V 10/26 |
| 2023/0098678 A1* | 3/2023 | Zhang | ................ | G10L 17/10 |
| | | | | 704/231 |
| 2023/0130777 A1* | 4/2023 | Spall | ................ | G10L 15/16 |
| | | | | 704/232 |
| 2023/0260536 A1* | 8/2023 | Xu | ................ | G10L 25/63 |
| | | | | 704/231 |

OTHER PUBLICATIONS

P. L. M. Liu, W. K. Kan and W. Wong, "A specification approach to artificial neural network design," IEEE TENCON'90: 1990 IEEE Region 10 Conference on Computer and Communication Systems. Conference Proceedings, Hong Kong, 1990, pp. 40-44 vol.1, doi: 10.1109/TENCON.1990.152562. keywords: {Artificial n (Year: 1990).*

* cited by examiner

*Primary Examiner* — Bharatkumar S Shah
(74) *Attorney, Agent, or Firm* — Shook Hardy & Bacon L.L.P.

(57) ABSTRACT

Some aspects of the technology described herein employ a neural network with an efficient and lightweight architecture to perform spoken language recognition. Given an audio signal comprising speech, features are generated from the audio signal, for instance, by converting the audio signal to a normalized spectrogram. The features are input to the neural network, which has one or more convolutional layers and an output activation layer. Each neuron of the output activation layer corresponds to a language from a set of language and generates an activation value. Based on the activations values, an indication of zero or more languages from the set of languages is provided for the audio signal.

20 Claims, 8 Drawing Sheets

SPOKEN LANGUAGE RECOGNITION

BACKGROUND

Automatic speech recognition is a technology that allows computers to recognize and transcribe spoken language into written or electronic text or otherwise perform actions based on the spoken language. Automatic speech recognition systems are used in a variety of applications, including voice recognition for mobile phones and virtual assistants, transcription services, and captioning for television and movies.

Spoken language recognition is the task of automatically identifying which spoken language is present in a speech signal. With the growing use of automatic speech recognition for user applications in a global market, spoken language recognition has becoming increasingly important, since automatic speech recognition systems typically require prior knowledge of the language to be transcribed.

SUMMARY

Some aspects of the present technology relate to, among other things, efficient and lightweight model architectures for spoken language recognition. In accordance with some configurations, a neural network based on convolutional architectures is trained for multi-label classification to detect a set of languages from audio signals. The neural network includes one or more convolutional layers and an output activation layer. The output activation layer includes a number of neurons corresponding with the number of languages for which the neural network is trained to detect. Each neuron in the output activation layer generates an activation value for a corresponding language, and allows for zero, one, or multiple languages from the set of languages to be identified for speech in an audio signal.

Given an audio signal, the system initially processes the audio signal to generate features for input to the neural network. For instance, the audio signal could be converted to a normalized spectrogram. The features are provided as an input to the neural network, which processes the features using the one or more convolutional layers and output activation layers of the network. The neurons of the output activation layer provide an activation value corresponding to each language from the set of languages for which the neural network is trained to detect. Based on the activation values and a threshold activation value, zero, one, or multiple languages from the set of languages are identified for the speech in the audio signal.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Some modern automatic speech recognition techniques have achieved near human accuracy for various languages, and currently enable applications such as text-based audio/video editing, voice translation, and virtual assistants. When the spoken language is not known in advance, spoken language recognition is often a necessary first step before automatic speech recognition can be applied, since most automatic speech recognition systems require knowledge of the spoken language of a speech signal to correctly transcribe the speech signal.

Past research in spoken language recognition has been organized around challenges such as National Institute of Standards and Technology (NIST) Language Recognition Evaluations, focusing on improving accuracy with large neural networks and extensive data. Recent advances in large-scale and self-supervised models have achieved impressive generalization across hundreds of languages with near-perfect accuracy. However, there are a number of shortcomings of current spoken language recognition models.

One shortcoming of current spoken language recognition models is that they are generally too large-scale to run on user devices. Most modern spoken language recognition systems are based on deep architectures, containing millions if not tens or hundreds of millions of parameters. However, as automatic speech recognition becomes more ubiquitous across devices, there is growing need for robust spoken language algorithms that can run efficiently embedded on-device. Spoken language recognition on-device eliminates computation and networking costs involved with running spoken language in the cloud, and can prevent tracking and other potential threats to user privacy. However, current large-scale spoken language recognition models are impractical to use on user devices (e.g., a mobile device or smart speaker), due to size and runtime constraints.

Another shortcoming of current spoken language recognition models is dealing with spoken languages not recognized by the models. In particular, spoken language recognition models are typically designed to recognize a certain set of languages. In many automatic speech recognition applications, where only a subset of all languages are available, it is often desired to identify non-supported languages as "other," so that an erroneous transcription using an incorrect language is avoided. To address this, it is common for current spoken language recognition models to employ multiclass tasks using an additional class ("other") and treat it as another language. In other words, the spoken language recognition models are trained to include an "other" class in addition to classes for a set of languages recognized. The goal is to allow the spoken language model to identify the "other" class for any instances in which an audio signal includes a spoken language not in the set of languages recognized. However, this approach yields subpar results. One potential reason for this is that because the "other" class must identify many languages including some that can be similar to one of the target languages, this makes it harder for the spoken language model to separate the "other" class from the target classes (e.g., Catalan should be classified as "other" if it is not one of the target languages, but can be relatively close to languages in the target set such as Spanish and French).

Aspects of the technology described herein improve the functioning of the computer itself in light of these shortcomings in existing technologies by providing a system that employs efficient and lightweight model architectures for spoken language recognition based on convolutional architectures. The system employs a neural network having one or more convolutional layers and an output activation layer having a number of neurons corresponding to the number of languages for which the neural network is trained to predict. For instance, if the neural network is trained to detect seven languages (e.g., English, Spanish, French, German, Italian, Japanese, and Mandarin), the output activation layer includes seven neurons (i.e., each neuron corresponding with one of the seven languages). The neural network is trained for multi-label classification, such that the system allows for zero, one, or multiple languages from the set of languages to be identified for speech in an audio signal.

Given an audio signal, the system initially processes the audio signal to generate features for input to the neural network. In some aspects, the system converts the audio signal to a spectrogram (e.g., using a Fourier transform) and normalizes the spectrogram. The spectrogram can comprise a log-mel spectrogram in some configurations, and the spectrogram can be normalized using Per-Channel Energy Normalization (PCEN). The features (e.g., normalized spectrogram) are input to the neural network, which processes the features using the one or more convolution layers and output activation layer. The neurons of the output activation layer provide an activation value for each language from the set of languages for which the neural network is trained to detect. For instance, continuing the example above in which the neural network is trained to detect a set of seven languages (e.g., English, Spanish, French, German, Italian, Japanese, and Mandarin), each neuron in the output activation layer provides an activation value for a corresponding language from that set of seven languages. The system identifies zero, one, or multiple spoken languages for the audio signal based on the activation values and a threshold activation value. For instance, if no activation value satisfies the threshold activation value, zero languages from the set of languages are identified. This indicates that the spoken language is some "other" language not in the set of languages recognized by the neural network. If one activation value satisfies the threshold activation value, the language corresponding to that neuron is identified. If more than one activation value satisfies the threshold activation value, either the language corresponding to the highest activation value is identified or each language corresponding to the activation values satisfying the threshold activation value is identified.

Aspects of the technology described herein provide a number of improvements over existing technologies. For instance, the technology described herein provides efficient and lightweight model architectures for spoken language recognition. The model architectures achieve competitive recognition accuracy, while being orders of magnitude smaller (in number of parameters) and faster in terms of inference time than current state-of-the-art methods. Additionally, some aspects employ a multi-label training strategy, as opposed to the more commonly used multiclass training. This multi-label approach more elegantly handles "other" languages by allowing for zero languages to be identified. In contrast, as discussed above, multiclass approaches typically handle other languages by using an additional "other" class and assigning all non-supported languages to this class. The multi-label approach increases model accuracy without adding any additional complexity to the model. Some aspects of the present technology employ additional techniques that further enhance performance, including: using PCEN as a normalization technique; and augmenting training data used to train the neural network to be robust to noise.

Example System for Spoken Language Recognition

Figure 1:
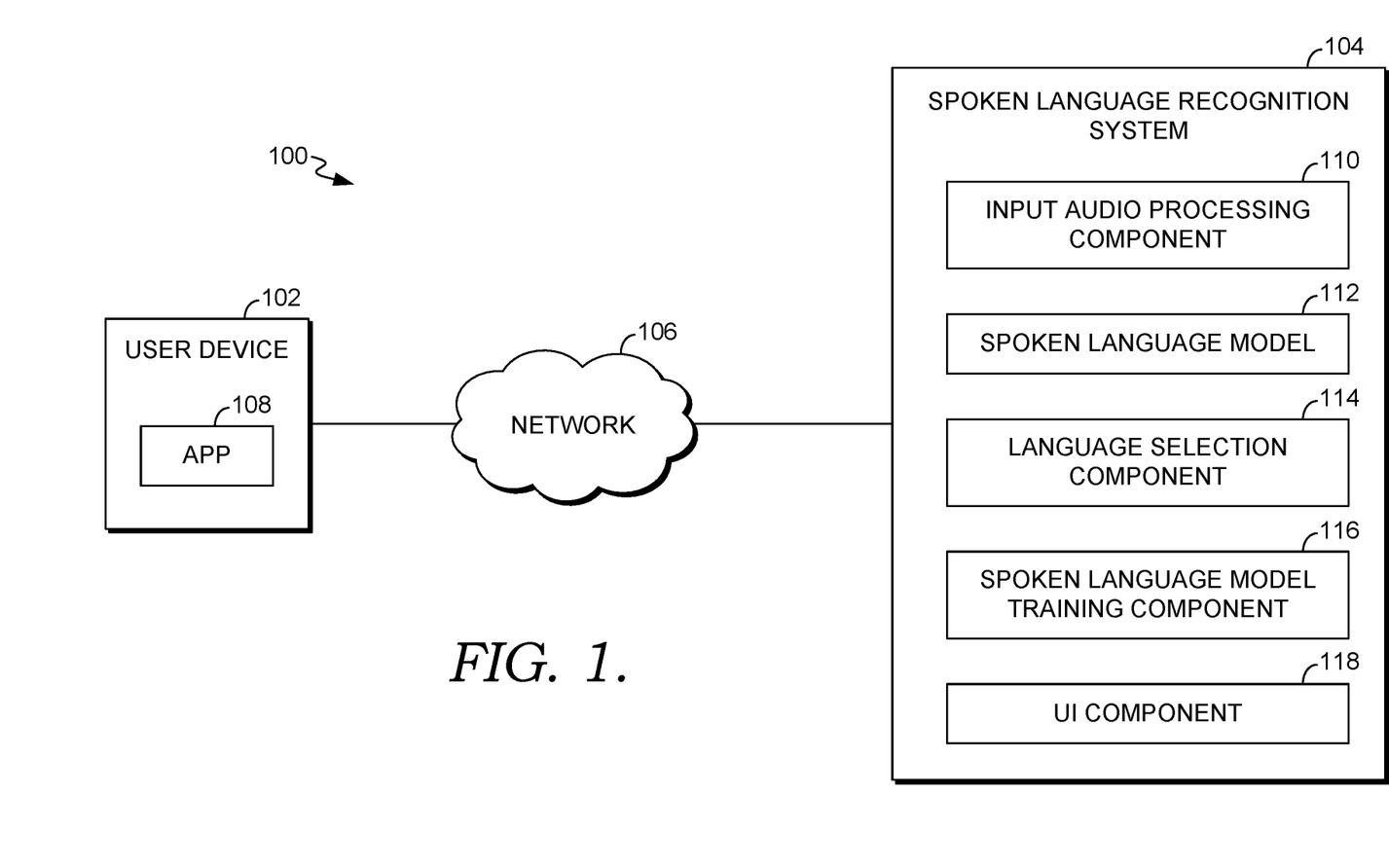
FIG. 1 is a block diagram illustrating an exemplary system in accordance with some implementations of the present disclosure.

With reference now to the drawings, FIG. 1 is a block diagram illustrating an exemplary system 100 for performing spoken language recognition in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a spoken language recognition system 104. Each of the user device 102 and spoken language recognition system 104 shown in FIG. 1 can comprise one or more computer devices, such as the computing device 800 of FIG. 8, discussed below. As shown in FIG. 1, the user device 102 and the spoken language recognition system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of client devices and server devices can be employed within the system 100 within the scope of the present technology. Each can comprise a single device or multiple devices cooperating in a distributed environment. For instance, the spoken language recognition system 104 could be provided by multiple server devices collectively providing the functionality of the spoken language recognition system 104 as described herein. Additionally, other components not shown can also be included within the network environment.

The user device 102 can be a client device on the client-side of operating environment 100, while the spoken language recognition system 104 can be on the server-side of operating environment 100. The spoken language recognition system 104 can comprise server-side software designed to work in conjunction with client-side software on the user device 102 so as to implement any combination of the features and functionalities discussed in the present disclosure. For instance, the user device 102 can include an application 108 for interacting with the spoken language recognition system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the spoken language recognition system 104 remain as separate entities. While the operating environment 100 illustrates a configuration in a networked environment with a separate user device and spoken language recognition system, it should be understood that other configurations can be employed in which components are combined. For instance, in some configurations, a user device can also provide capabilities of the technology described herein.

The user device 102 can comprise any type of computing device capable of use by a user. For example, in one aspect, the user device can be the type of computing device 800 described in relation to FIG. 8 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the spoken language recognition system 104 via the user device 102.

At a high level, the spoken language recognition system 104 employs a spoken language model to perform spoken language recognition on audio signals. This could be used, for instance, to support automatic speech recognition, as well as other applications. As shown in FIG. 1, the spoken language recognition system 104 includes an input audio processing component 110, a spoken language model 112, a language selection component 114, a spoken language model training component 116, and a user interface component 118. The components of the spoken language recognition system 104 can be in addition to other components that provide further additional functions beyond the features described herein. The spoken language recognition system 104 can be implemented using one or more server devices, one or more platforms with corresponding application programming interfaces, cloud infrastructure, and the like. While the spoken language recognition system 104 is shown separate from the user device 102 in the configuration of FIG. 1, it should be understood that in other configurations, some or all of the functions of the spoken language recognition system 104 can be provided on the user device 102.

In one aspect, the functions performed by components of the spoken language recognition system 104 are associated with one or more applications, services, or routines. In particular, such applications, services, or routines can operate on one or more user devices, servers, can be distributed across one or more user devices and servers, or be implemented in the cloud. Moreover, in some aspects, these components of the spoken language recognition system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The input audio processing component 110 of the spoken language recognition system 104 generates input features from an audio signal and provides the input features as input to the spoken language model 112. In some aspects, the input features comprise an input feature map, such as a spectrogram, generated from an audio signal of speech (i.e., a speech signal) in an audio file. In particular, given an audio file comprising speech, the input audio processing component 110 can use a Fourier transform or other technique to convert a speech signal from the audio file to a spectrogram. The spectrogram provides a visual representation of the spectrum of frequencies in the speech signal as a function of time. In some configurations, the input audio processing component 110 generates a log-mel spectrogram, which employs a logarithmic transformation of the audio signal's frequency using the mel scale. The mel scale is a perceptual scale of pitches judged by listeners to be equal in distance from one another. It is based on the way the human ear perceives different frequencies and is approximately linear over a large range of frequencies.

In some aspects, the input audio processing component 110 normalizes the spectrogram to provide a normalized spectrogram as input to the spoken language model 112. In some configurations, the input audio processing component 110 employs Per-Channel Energy Normalization (PCEN) (e.g., after a log-mel spectrogram computation). PCEN is a normalization technique that allows for (i) temporal integration, (ii) gain control, and (iii) dynamic range compression.

The spoken language model 112 takes the input features generated from an audio signal by the input audio processing component 110 and performs multiple convolution operations to support recognition of the spoken language in the audio signal. In accordance with various aspects of the present technology, the spoken language model 112 comprises a neural network with convolutional layers trained using a multi-label approach for a set of languages. As such, the spoken language model 112 provides for multi-label classification in which, for a given audio signal, zero languages from the set of languages can be detected (e.g., an "other" language could be assigned), one language from the set of languages can be detected, or multiple languages from the set of languages can be detected. This is in contrast to multiclass classification in which only a single language can be detected.

In some aspects, the spoken language model 112 employs a sigmoid output layer that includes a number of neurons corresponding to the number of languages in the set for which the spoken language model 112 is designed and trained to detect. Each neuron in the sigmoid output layer corresponds with one of the languages from the set. For instance, if the spoken language model 112 is designed for a set of seven languages (e.g., English, Spanish, French, German, Italian, Japanese, and Mandarin), the sigmoid output layer would include seven neurons (e.g., a first neuron for English, a second neuron for Spanish, a third neuron for French, a fourth neuron for German, a fifth neuron for Italian, a sixth neuron for Japanese, and a seventh neuron for Mandarin). It should be understood that the spoken language model 112 can be designed to recognize any number of languages.

Each neuron in the sigmoid output layer employs a sigmoid activation providing an activation value. The activation value can be within a certain range (e.g., between 0 and 1, or between −1 and 1). The activations value for a given neuron can represent a probability that a spoken language from the audio is the language for that neuron. Because a sigmoid activation is used, each neuron can have any activation value within the range of activation values independent of the activation values of other neurons. In other words, if a range of 0 to 1 is used, the sum of the activation values from the neurons does not need to equal to 1. This is in contrast to a softmax activation (typically used for multiclass classification) in which the activation values sum to 1.

The language selection component 114 identifies a language based on the activation values from the neurons of the sigmoid output layer of the spoken language model 112. In some configurations, the language selection component 114 employs a threshold activation value to identify a language. For instance, if no activation value from the neurons of the sigmoid output layer are above the threshold activation value, the language selection component 114 identifies no language or an "other" language has been detected. If the activation value from only one of the neurons is above the threshold activation value, the language selection component 114 identifies the language corresponding to that neuron has been detected. If the activation value for more than one of the neurons is above the threshold activation value, the language selection component 114 identifies that each of the languages corresponding to those neurons has been detected or that the language for the neuron with the highest activation value has been detected.

By way of illustration, Table 1 below provides examples of activation values and the detected spoken language output for three different audio clips. For each audio clip, an activation value is indicated for each language from a set of seven languages, and a spoken language output determined based on the activation values is indicated. In the present example, the range of possible activation values is 0 to 1, and the threshold activation value is 0.5. For the first audio clip, no activation value satisfies the 0.5 threshold activation value. As such, the spoken language output indicates that no language or "other" language is detected. For the second audio clip, the activation value for Mandarin is the only activation value satisfying the 0.5 threshold value. As such, Mandarin is output as the detected spoken language. For the third audio clip, the activation values for both English and German satisfy the 0.5 threshold activation value. In some configurations, English is output as the detected spoken language because the activation value for English is greater than the activation value for German. In other configurations, both English and German are output as detected spoken languages.

TABLE 1

Example Activation Values and Detected Language Output

| Audio Clip | English | Spanish | French | German | Italian | Japanese | Mandarin | Language Detected |
|---|---|---|---|---|---|---|---|---|
| Audio Clip 1 | 0.3 | 0.1 | 0.1 | 0.2 | 0.1 | 0.05 | 0.05 | None or Other |
| Audio Clip 2 | 0.1 | 0.15 | 0.15 | 0.1 | 0.2 | 0.4 | 0.9 | Mandarin |
| Audio Clip 3 | 0.7 | 0.4 | 0.4 | 0.6 | 0.3 | 0.1 | 0.1 | English or English and German |

The spoken language model training component 116 trains the spoken language model 112 using a training dataset comprising audio clips of spoken language labeled by language. For instance, the VoxLingua 107 dataset could be used for training. The VoxLingua 107 set comprises 6,628 hours of speech from 107 languages, with an average of 62 hours per language in the training subset. In some aspects, to make the spoken language model 112 robust to real-world recordings, the training dataset is augmented to train the spoken language model 112 to be more robust to noise. In some aspects, the training dataset is augmented with noise, reverb, and random equalization, for instance, using Hi-Fi-GAN-2. If the training dataset is imbalanced in terms of hours per language, the above augmentation method or an alternative method can be used to replenish the languages with less data, such that each epoch contains a balanced set of languages during training. In real-world scenarios, it is often the case that only a subset of languages are available for speech applications. In various configurations of the present technology, the spoken language model 112 is designed to detect a subset of languages from an overall set of languages in a training dataset. For instance, the spoken language model 112 could be trained to detect 10 languages from the 107 languages contained in the VoxLingua 107 dataset.

The spoken language model training component 116 trains the spoken language model 112 over a series of epochs in which audio clips are provided as input to the spoken language model 112, which performs multi-label classification based on the audio clips, and a loss (e.g., using a binary cross-entropy loss function) is determined based on the output from the spoken language model 112 and the labels for the audio clips. The spoken language model training component 116 updates parameters (e.g., weights) of the spoken language model 112 based on the loss, for instance, via backpropagation.

Figure 2:
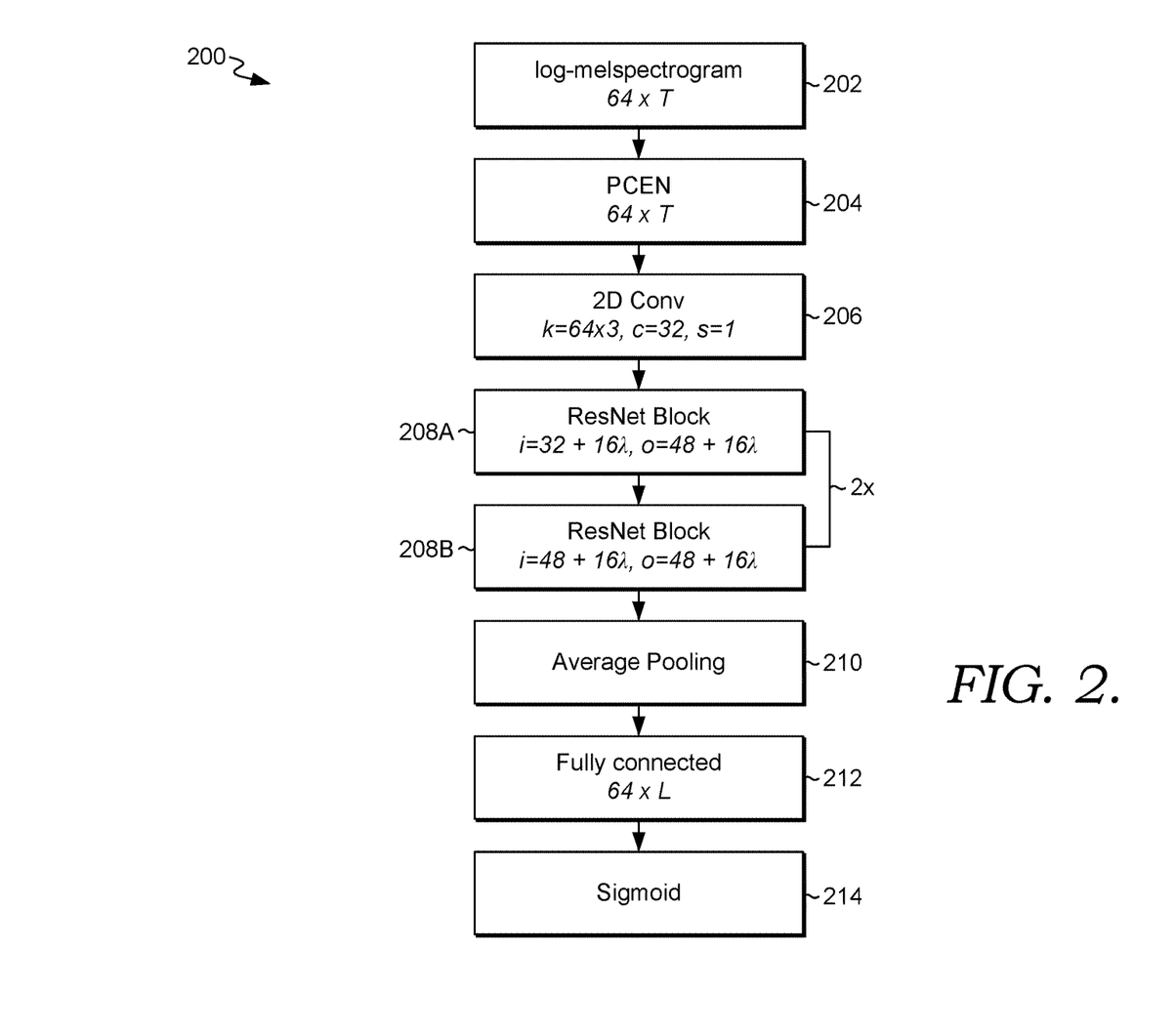
FIG. 2 is a diagram illustrating a spoken language model architecture in accordance with some implementations of the present disclosure.
Figure 3:
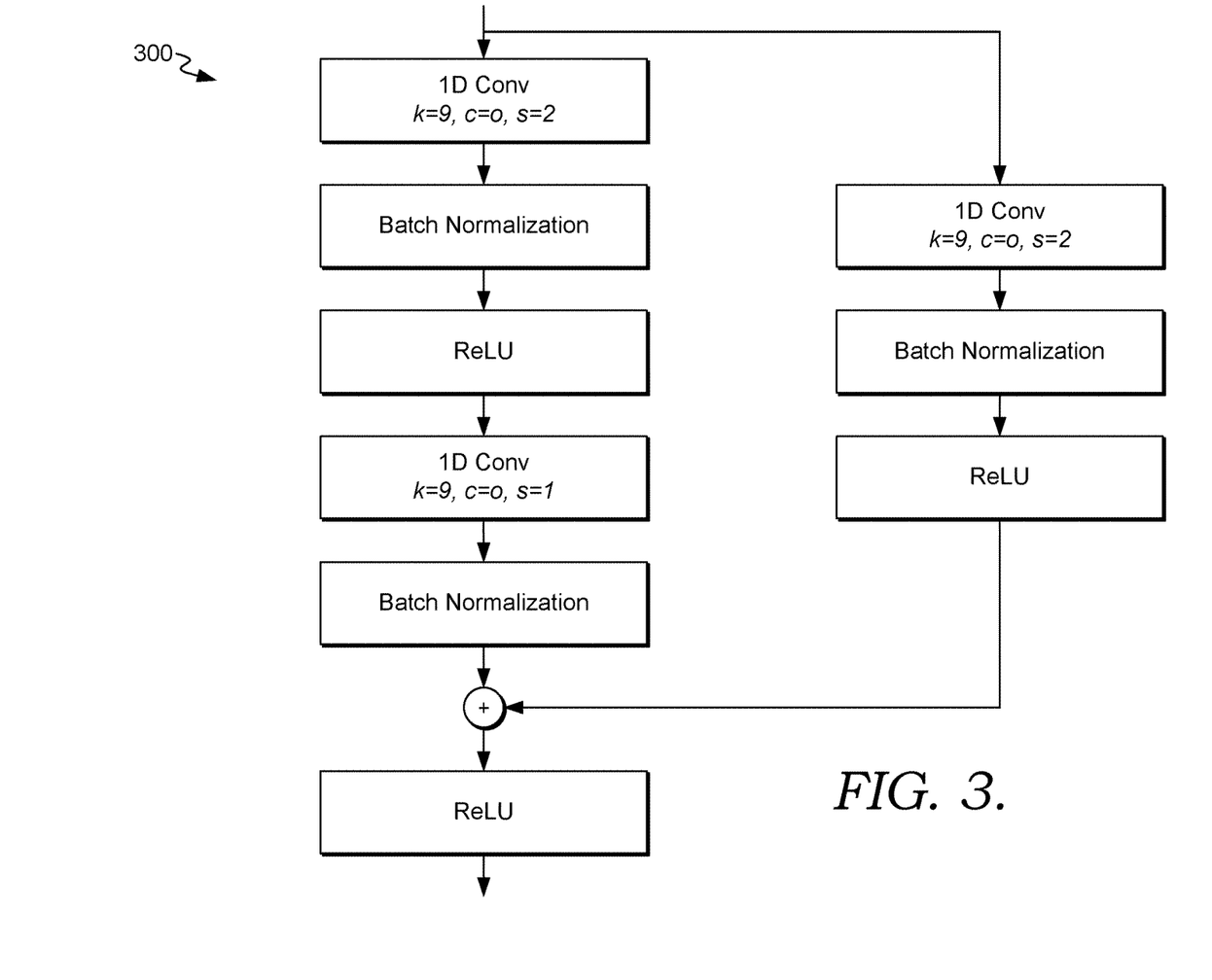
FIG. 3 is a diagram showing a ResNet block of the spoken language model of FIG. 2 in accordance with some implementations of the present disclosure.

FIGS. 2-5 provide block diagrams showing example architectures for spoken language models in accordance with some aspects of the present technology. With initial reference to FIG. 2, a block diagram is provided showing an example architecture 200 for a spoken language model based on a Temporal Convolution Residual Network (TC-ResNet) architecture with fewer parameters and layers. FIG. 3 provides a block diagram showing an example architecture 300 of a Residual Network (ResNet) block from the TC-ResNet architecture 200 of FIG. 2. The following notations are used in FIGS. 2 and 3: T is time frames, c is number of channels, s is stride, k is width of filters, L is number of languages, and i and o are input and output to each ResNet block, respectively.

The architecture 200 begins with blocks for processing an audio signal to generate input features for processing by convolutional layers. As shown in block 202, an input audio signal is processed to generate a log-mel spectrogram. For instance, the log-mel spectrogram could be computed using a 25 ms Hann window, a Fast Fourier Transform (FFT) size of 64 ms, and a 10 ms hop size. The log-mel spectrogram is normalized at block 204. In particular, PCEN is employed to provide a normalized log-mel spectrogram, which is provided as input features to convolutional layers of the spoken language recognition model. The input features could be, for instance, a normalized log-mel spectrogram with 64 mel-frequency bins computed from an input audio signal sampled at 16 kHz.

As shown at block 206, a 2D convolution is applied to the input features (i.e., normalized log-mel spectrogram) with a kernel whose height is as large as the number of frequency bins. This is equivalent to a 1D convolution, treating the height dimension as number of channels. This compacts the frequency dimension into a set of 1D time representations (one per channel), where 1D convolutions can be applied in the subsequent layers of the architecture, making it highly efficient in both number of parameters and computation time. Two ResNet blocks 208A and 208B are repeated (i.e., there is a total of 4 blocks), and their sizes can change depending on the repetition number $\lambda \in \{0, 1\}$. FIG. 3 is a diagram showing the architecture 300 for each ResNet block 208A and 208B in accordance with some configurations of the present technology. As shown in FIG. 3, the architecture 300 includes a series of 1D convolutions, batch normalizations, and rectified linear (ReLU) activations.

Average pooling 210 is performed on the output from the ResNet blocks 208A and 208B, followed by a fully connected layer 212 and a sigmoid output layer 214. The sigmoid output layer 214 has a number of neurons corresponding to a number of languages for which the spoken language model is designed. For instance, if spoken language model is designed for 10 languages, the sigmoid output layer 214 includes 10 neurons. Each neuron includes a sigmoid activation function to provide an activation value within a range of activation values. Because a sigmoid activation is used, each neuron can have any activation value within the range of activation values independent of the activation values of other neurons.

Figure 4:
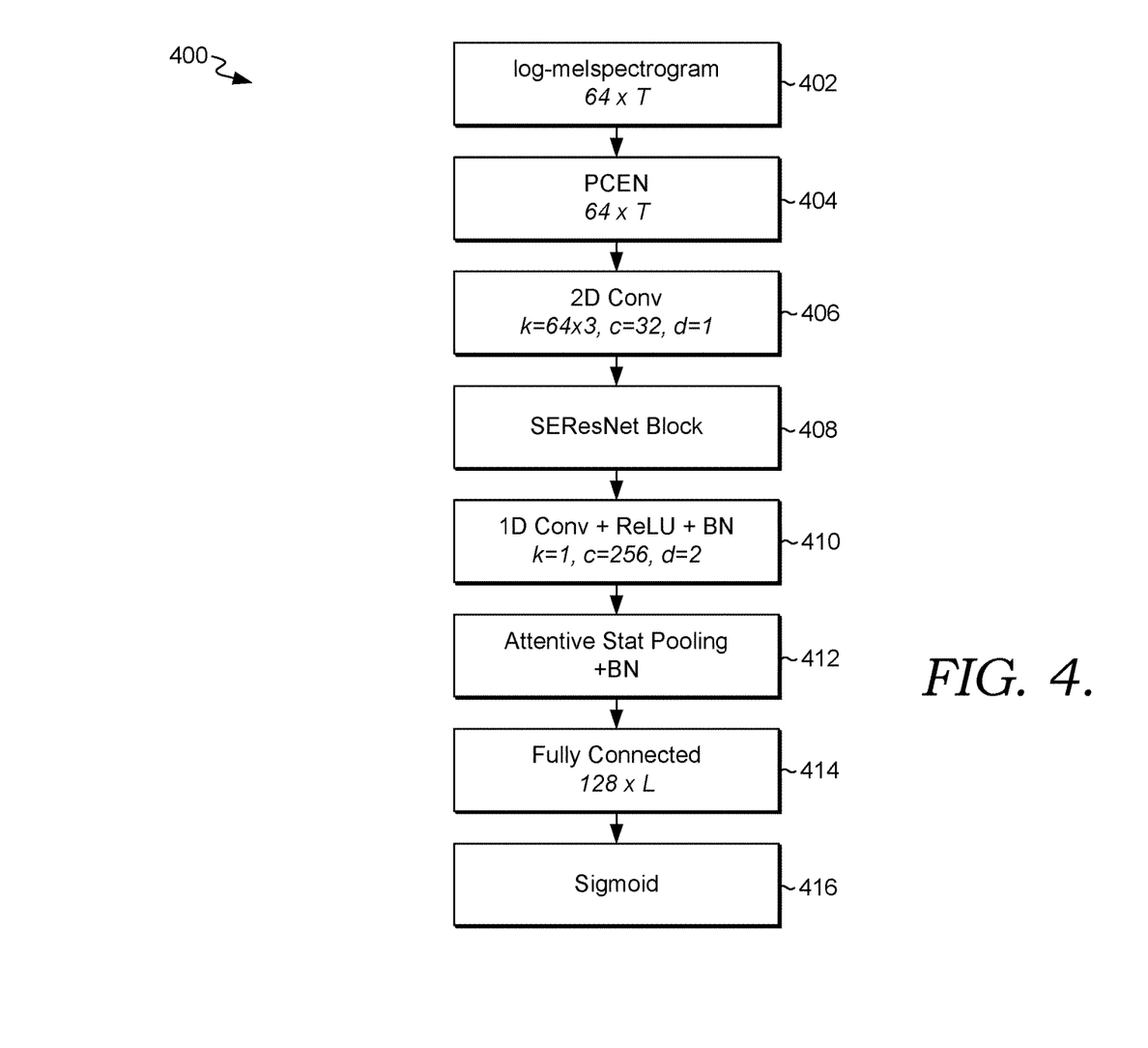
FIG. 4 is a diagram showing another spoken language model architecture in accordance with some implementations of the present disclosure.
Figure 5:
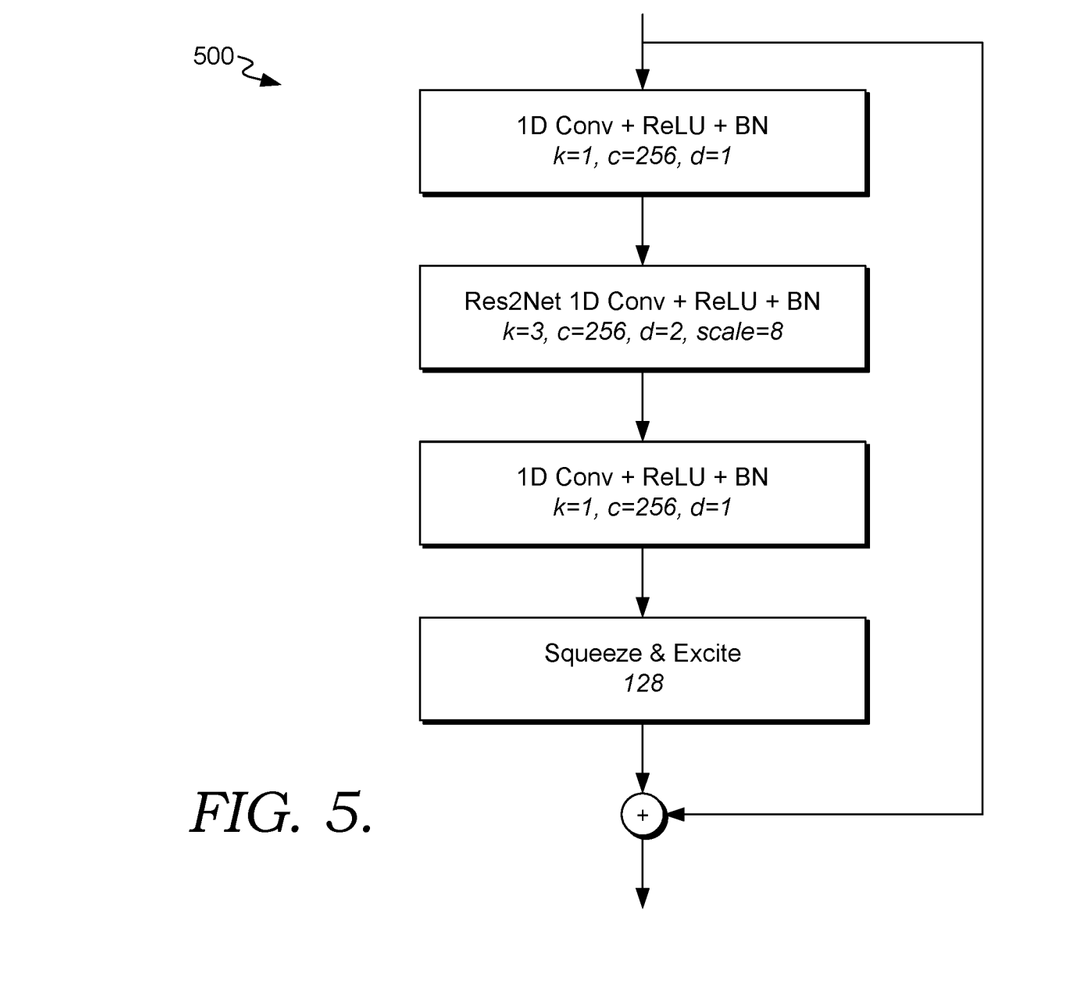
FIG. 5 is a diagram showing a SEResNet block of the spoken language model of FIG. 4 in accordance with some implementations of the present disclosure.

FIG. 4 provides a block diagram showing another example architecture 400 for a spoken language model based on an emphasized channel attention, propagation and aggregation Time-Delayed Neural Network (ECAPA-TDNN) architecture with fewer parameters and layers. FIG. 5 provides a block diagram showing an example architecture 500 of a squeeze and excite Residual Network (SEResNet) block from the architecture 400 of FIG. 4. The following notations are used in FIGS. 4 and 5: T is time frames, c is number of channels, d is dilation size, k is width of filters, L is number of languages, BN is batch normalization, and scale is the scale for a Res2Net model. All convolutional strides are set to 1 in the architectures 400 and 500.

Similar to the architecture 200 of FIG. 2, the architecture 400 begins with blocks for processing an audio signal to generate input features for processing by convolutional layers. As shown in block 402, an input audio signal is processed to generate a log-mel spectrogram. For instance, the log-mel spectrogram could be computed using a 25 ms Hann window, a Fast Fourier Transform (FFT) size of 64 ms, and a 10 ms hop size. The log-mel spectrogram is normalized at block 404. In particular, PCEN is employed to provide a normalized log-mel spectrogram, which is provided as input features to convolutional layers of the spoken language recognition model. The input features could be, for instance, a normalized log-mel spectrogram with 64 mel-frequency bins computed from an input audio signal sampled at 16 kHz.

As shown at block 406, a 2D convolution, ReLU activation, and batch normalization are applied to the input features, followed by a SEResNet block 408. FIG. 5 is a diagram showing the architecture 500 for the SEResNet block 408 in accordance with some configurations of the present technology. As shown in FIG. 5, the architecture 500 includes a series of 1D convolutions, ReLU activations, batch normalizations, a Res2Net, and a squeeze and excite operation.

As shown at block 410, a 1D convolution with a ReLU activation and batch normalization is applied to the output from the SEResNet block 408. Attentive stat pooling with batch normalization is applied at block 412, followed by a fully connected layer 414 and a sigmoid output layer 416. The sigmoid output layer 416 has a number of neurons corresponding to a number of languages for which the spoken language model is designed. For instance, if spoken language model is designed for 10 languages, the sigmoid output layer 416 includes 10 neurons. Each neuron includes a sigmoid activation function to provide an activation value with a range of activation values. Because a sigmoid activation is used, each neuron can have any activation value within the range of activation values independent of the activation values of other neurons.

The user interface component 118 of the spoken language recognition system 104 provides one or more user interfaces for interacting with the spoken language recognition system 104. For instance, the user interface component 118 can provide user interfaces to a user device, such as the user device 102, that are presented on the user device 102 using the application 108. Among other things, the user interfaces provided by the user interface component 118 can enable a user to interact with the spoken language recognition system 104 to provide audio as input for the spoken language recognition system 104 to perform spoken language recognition for speech in the audio as described hereinabove. The user interface component 118 can also provide user interfaces with user interface elements allowing a user to control any configurable aspects of the designing and training of the spoken language model 112. The user interface component 118 can further provide user interfaces that facilitate downstream applications/tasks based on the spoken language recognition.

Example Methods for Spoken Language Recognition

Figure 6:
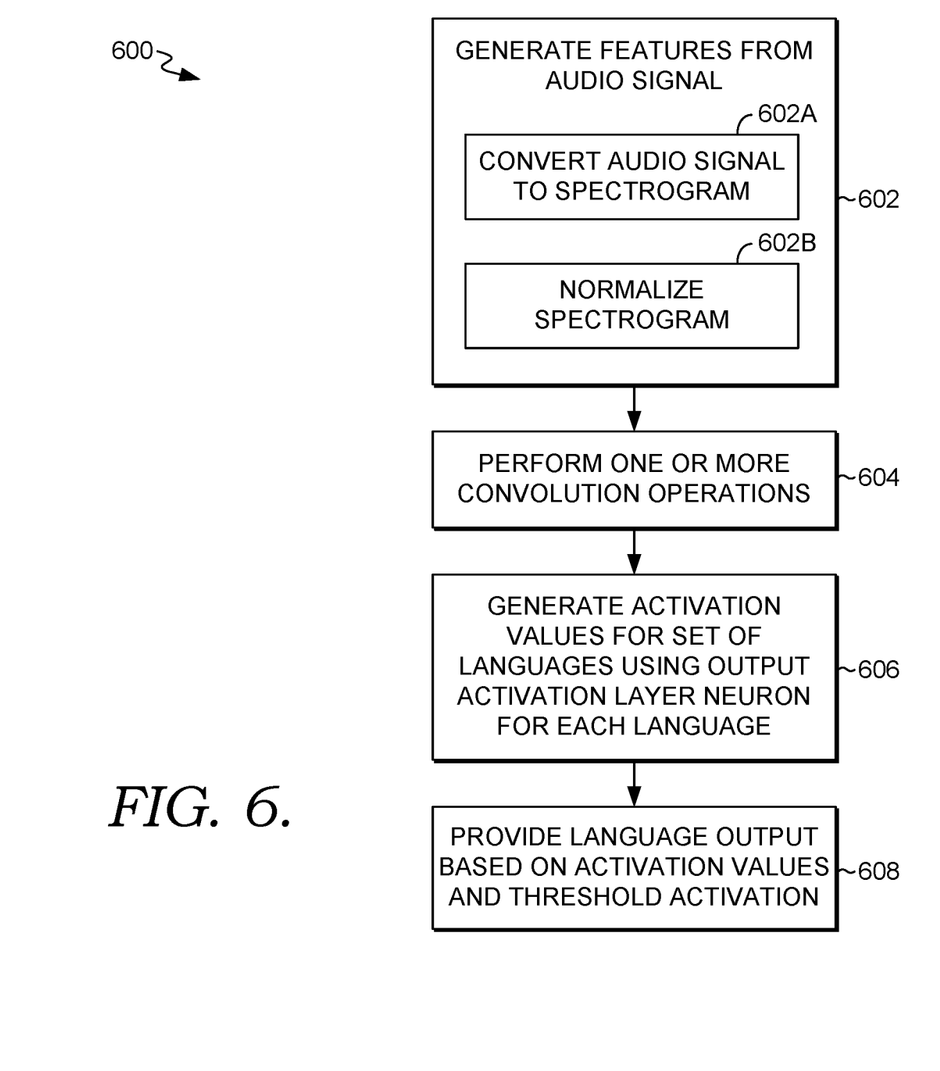
FIG. 6 is a flow diagram showing a method for performing spoken language recognition in accordance with some implementations of the present disclosure.

With reference now to FIG. 6, a flow diagram is provided that illustrates a method 600 for performing spoken language recognition using a spoken language model. The method 600 can be performed, for instance, by the spoken language recognition system 104 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, an audio signal is processed to generate input features. In some aspects, the input features generated from the audio signal comprise an input feature map, such as a spectrogram (which could be normalized). As shown at block 602A, the audio signal is converted to a spectrogram. For instance, a Fourier transform or other technique could be used to convert the audio signal to a spectrogram. In some configurations, the spectrogram comprises a log-mel spectrogram. As shown at block 602B, the spectrogram is normalized. In some configurations, the spectrogram is normalized using Per-Channel Energy Normalization (PCEN).

Given the input features computed from the audio signal, one or more convolution operations are performed by a neural network, as shown at block 604. Activation values are generated for a set of languages by neurons of an output activation layer of the neural network, as shown at block 606. The number of neurons in the output activation layer correspond to the number of languages for which the neural network is designed and trained to recognize. For instance, if the neural network is trained to recognize languages from a set of 10 languages, the output activation layer includes 10 neurons and generates 10 activations values (i.e., one activation value for each language).

As shown at block 608, a spoken language output is provided based on the activation values and a threshold activation value. If no activation value from the neurons of the output activation layer are above the threshold activation value, no language or an "other" language is indicated in the spoken language output. If the activation value from only one of the neurons is above the threshold activation value, the language corresponding to that neuron is indicated in the spoken language output. If the activation value for more than one of the neurons is above the threshold activation value, in some instances, each of the languages corresponding to those neurons are indicated in the spoken language output; while in other instances, the language for the neuron with the highest activation value is indicated in the spoken language output.

Figure 7:
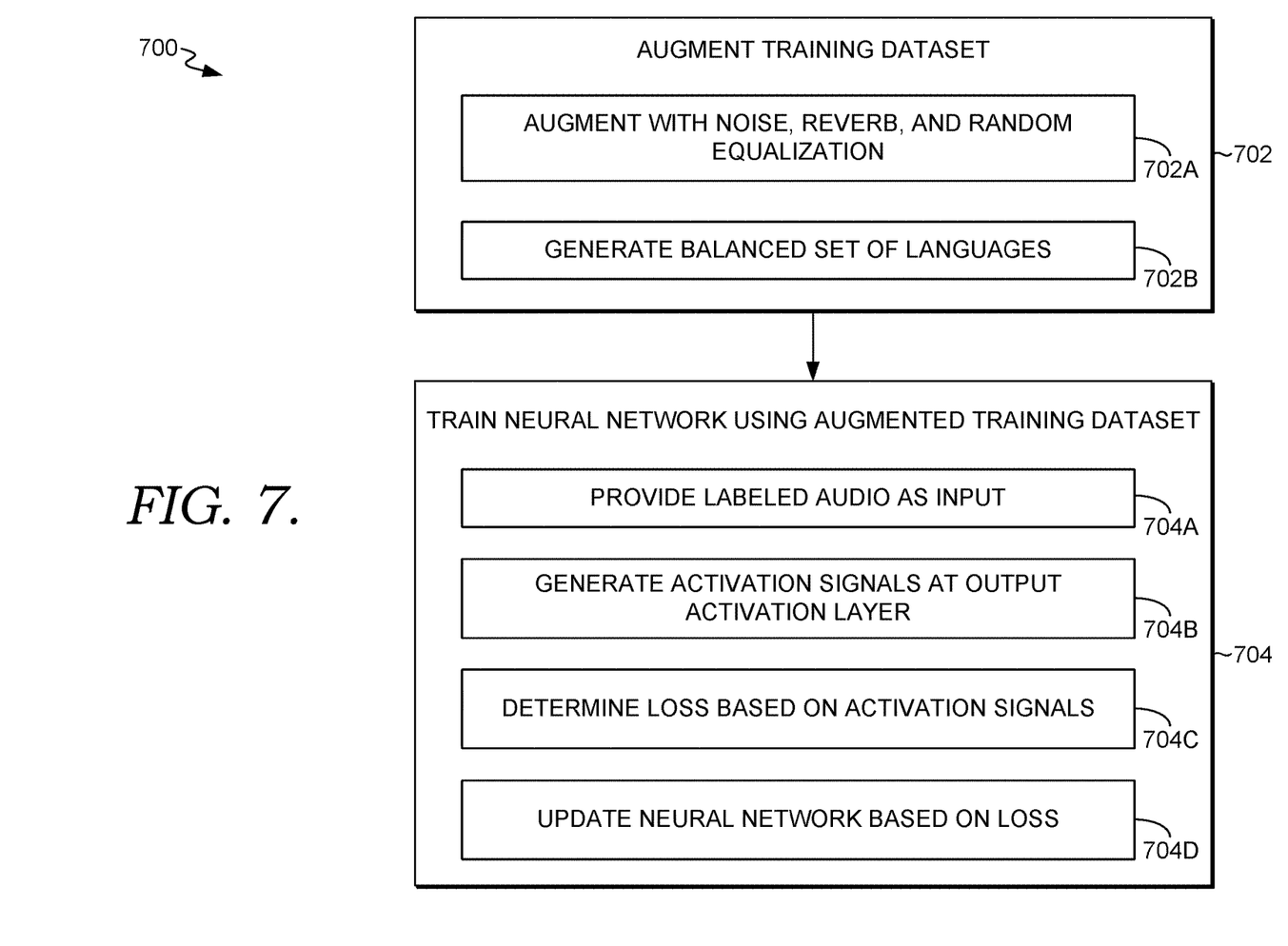
FIG. 7 is a flow diagram showing a method for training a spoken language model in accordance with some implementations of the present disclosure.

Turning next to FIG. 7, a flow diagram is provided showing a method 700 for training a spoken language model. The method 700 could be performed, for instance, by the spoken language model training component 116 of FIG. 1. As shown at block 702, a training dataset is augmented. The training dataset can comprise a collection of audio clips containing speech labeled by the spoken language of the speech in each audio clip. The training dataset can be augmented with noise, reverb, and random equalization, as shown at block 702A. Additionally, the training dataset can be augmented by generating a balanced set of languages, as shown at block 702B.

As shown at block 704, a neural network is trained using the augmented training dataset. The neural network is trained over a number of epochs. Each epoch can include providing a labeled audio from the training dataset as input, as shown at block 704A. The audio is labeled with an indication of the spoken language of speech in the audio. The audio signal is converted to input features (e.g., a normalized spectrogram), which are processed by layers of the neural network. Activations signals are generated at an output activation layer of the neural network, as shown at block 704B. The output activation layer includes a number of neurons corresponding to a number of languages for which the neural network is designed to recognize. For instance, if the neural network is designed to recognized 10 languages, the output activation layer includes 10 neurons, providing 10 activation values. As shown at block 704C, a loss (e.g., a binary cross entropy loss) is determined based on the activation signals from the neurons of the output activation layer and the label for the audio. As shown at block 706D, parameters (e.g., weights) of the neural network are updated based on the loss, for instance, using backpropagation.

Exemplary Operating Environment

Figure 8:
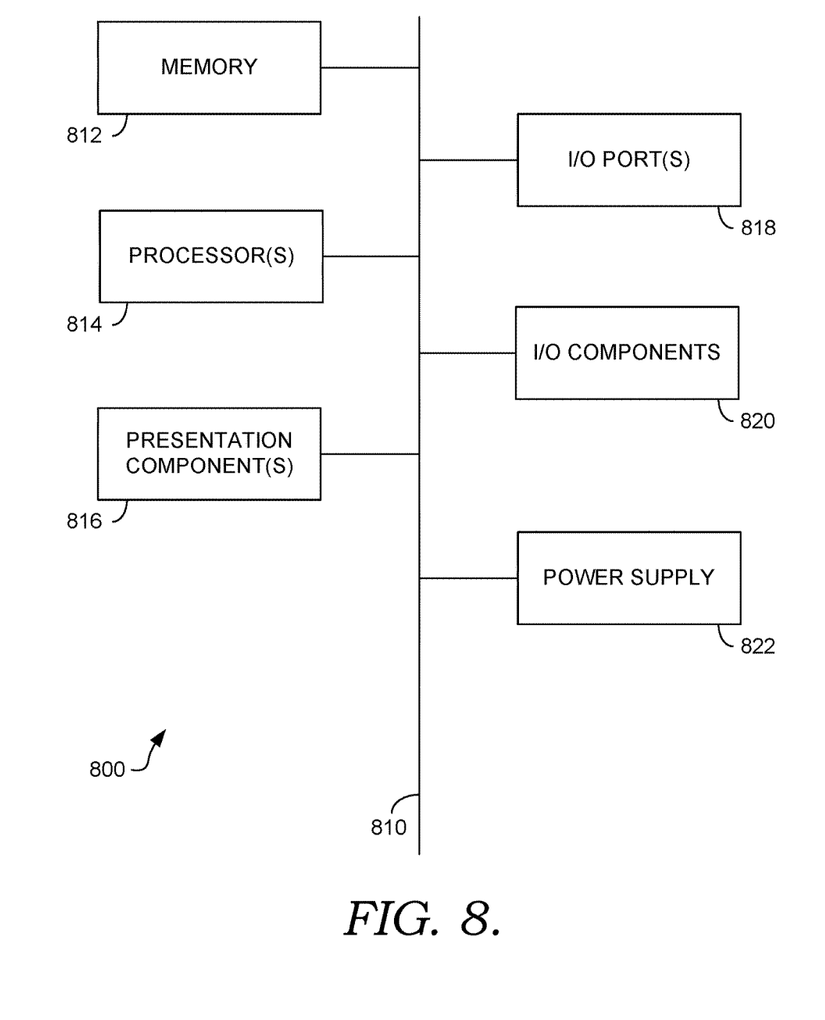
FIG. 8 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 8 in particular, an exemplary operating environment for implementing embodiments of the present technology is shown and designated generally as computing device 800. Computing device 800 is but one example of a suitable computing environment and is not intended to suggest any limitation as to the scope of use or functionality of the technology. Neither should the computing device 800 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what can be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory can be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which can be built in. Illustrative components include a microphone, joystick, game pad, satellite dish, scanner, printer, wireless device, etc. The I/O components 820 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 can be equipped with depth cameras, such as, stereoscopic camera systems, infrared camera systems, RGB camera systems, and combinations of these for gesture detection and recognition. Additionally, the computing device 800 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   generating features from an audio signal comprising speech;
   providing the features as input to a neural network having one or more convolutional layers and an output activation layer, each neuron of the output activation layer corresponding to a language from a set of languages and generating an activation value; and
   providing an indication of zero or more languages from the set of languages based on the activation value for each neuron of the output activation layer and an activation threshold value.

2. The one or more computer storage media of claim 1, wherein generating features from the audio signal comprises:
   converting the audio signal to a spectrogram; and
   normalizing the spectrogram to provide a normalized spectrogram.

3. The one or more computer storage media of claim 2, wherein the spectrogram comprises a log-mel spectrogram.

4. The one or more computer storage media of claim 2, wherein the spectrogram is normalized using per-channel energy normalization.

5. The one or more computer storage media of claim 1, wherein providing the indication of zero or more languages from the set of languages comprises:
   determining that the activation value for each neuron of the output activation layer does not satisfy the activation threshold value; and
   generating the indication to identify zero languages from the set of languages.

6. The one or more computer storage media of claim 1, wherein providing the indication of zero or more languages from the set of languages comprises:
   determining the activation value for only a first neuron of the output activation layer satisfies the activation threshold value; and
   generating the indication to identify the language corresponding to the first neuron of the output activation layer.

7. The one or more computer storage media of claim 1, wherein providing the indication of zero or more languages from the set of languages comprises:
   determining the activation value for each of two or more neurons of the output activation layer satisfies the activation threshold value; and
   generating the indication to identify the language corresponding to each of the two or more neurons of the output activation layer.

8. The one or more computer storage media of claim 1, wherein providing the indication of zero or more languages from the set of languages comprises:
   determining the activation value for each of two or more neurons of the output activation layer satisfies the activation threshold value;
   selecting a first neuron from the two or more neurons based on the first neuron having a highest activation value; and
   generating the indication to identify the language corresponding to the first neuron.

9. A computer-implemented method comprising:
   receiving an audio signal comprising speech in a first language;
   generating a normalized spectrogram from the audio signal;
   providing the normalized spectrogram as input to an input layer of a neural network;
   generating, by neurons of an output activation layer of the neural network, an activation value for each language from a set of languages, each neuron of the output activation layer corresponding to a language from the set of languages;
   providing a language output identifying zero or more languages based on the activation values and a threshold activation value.

10. The computer-implemented method of claim 9, wherein the normalized spectrogram comprises a normalized log-mel spectrogram.

11. The computer-implemented method of claim 9, wherein the normalized spectrogram is normalized using per-channel energy normalization.

12. The computer-implemented method of claim 9, wherein the input layer of the neural network comprises a first convolutional layer of one or more convolutional layers of the neural network.

13. The computer-implemented method of claim 9, wherein the set of languages does not comprise the first language; and wherein providing the language output comprises:
   determining that the activation value for each neuron of the output activation layer does not satisfy the activation threshold value; and
   generating the indication to identify zero languages from the set of languages.

14. The computer-implemented method of claim 9, wherein the set of languages comprises the first language; and wherein providing language output comprises:
   determining the activation value for a first neuron of the output activation layer corresponding to the first language satisfies the activation threshold value; and
   generating the language output to identify the first language.

15. The computer-implemented method of claim 9, wherein the set of languages comprises the first language; and wherein providing language output comprises:
   determining the activation value for a first neuron of the output activation layer corresponding to the first language satisfies the activation threshold value;
   determining the activation value for a second neuron of the output activation layer corresponding to a second language satisfies the activation threshold value;
   generating the language output to identify the first language and the second language.

16. The computer-implemented method of claim 9, wherein the set of languages comprises the first language; and wherein providing language output comprises:
  determining the activation value for a first neuron of the output activation layer corresponding to the first language satisfies the activation threshold value;
  determining the activation value for a second neuron of the output activation layer corresponding to a second language satisfies the activation threshold value;
  selecting the first language based on the activation value for the first neuron being greater than the activation value for the second neuron; and
  generating the language output to identify the first language.

17. A computer system comprising:
  one or more processors; and
  one or more computer storage media storing computer-useable instructions that, when used by the one or more processors, causes the one or more processors to perform operations comprising:
    receiving a training dataset comprising audio portions, each audio portion comprising an audio signal with speech and a label identifying a spoken language of the speech; and
    training a neural network using the training dataset over a plurality of epochs, at least one epoch comprising:
      generating input features from the audio signal of a first audio portion from the training dataset;
      providing the input features to the neural network;
      generating, by each neuron of a plurality of neurons in an output activation layer of the neural network, an activation value, each neuron of the plurality of neurons in the output activation layer corresponding to a language from a set of languages;
      determining a loss based on the activation values and the label identifying the spoken language for the first audio portion; and
      updating one or more parameters of the neural network based on the loss.

18. The computer system of claim 17, wherein the operations further comprise augmenting the training dataset with noise, reverb, and/or random equalization.

19. The computer system of claim 17, wherein the operations further comprise augmenting the training data set by generating a balanced set of spoken languages in the audio portions.

20. The computer system of claim 17, wherein the input features for the first audio portion comprise a normalized log-mel spectrogram generated from the audio signal of the first audio portion.

* * * * *